United States Patent [19]

Rao

[11] 4,230,651

[45] Oct. 28, 1980

[54] METHOD OF FABRICATING A HEAT EXCHANGER FOR STIRLING ENGINE

[75] Inventor: Vemulapalli D. N. Rao, Bloomfield Township, Oakland County, Mich.

[73] Assignee: Ford Motor Company, Dearborn, Mich.

[21] Appl. No.: 973,785

[22] Filed: Dec. 26, 1978

Related U.S. Application Data

[62] Division of Ser. No. 816,635, Jul. 18, 1977, Pat. No. 4,183,213.

[51] Int. Cl.³ .............................................. B29C 25/00
[52] U.S. Cl. .................................. 264/29.7; 264/29.5; 29/420; 29/156.4 R; 29/157.3 R
[58] Field of Search .................... 29/156.4 R, 157.3 R, 29/420, 420.5; 264/29.7, 29.5; 165/158; 60/517, 524, 525, 526

[56] References Cited

U.S. PATENT DOCUMENTS

| | | | |
|---|---|---|---|
| 2,188,289 | 1/1940 | Schwarze | 165/158 |
| 3,559,730 | 2/1971 | Denjean | 165/158 |
| 3,837,068 | 9/1974 | Dunn | 29/420.5 |
| 3,854,189 | 12/1974 | Ezis et al. | 29/420 |
| 3,885,294 | 5/1975 | Chaundy et al. | 29/420 |
| 3,887,412 | 6/1975 | Styhr et al. | 416/241 B |
| 3,947,550 | 3/1976 | Fitchmun | 264/29.7 |
| 3,991,457 | 11/1976 | Barton | 29/156.4 R |
| 4,020,635 | 5/1977 | Joynes et al. | 60/525 |
| 4,076,456 | 2/1978 | Tree et al. | 416/241 B |
| 4,119,141 | 10/1978 | Thut et al. | 165/158 |

FOREIGN PATENT DOCUMENTS 2315353  1/1977  France ............................... 29/157.3 R

*Primary Examiner*—Daniel C. Crane
*Attorney, Agent, or Firm*—Joseph W. Malleck; Keith L. Zerschling

[57] ABSTRACT

A heat exchange assembly and method for making same is disclosed which is useful for Stirling engine heater head constructions. The assembly is comprised entirely of a low cost extrudable material, such as silicon, which when fused in a carburizing furnace provides a rigid highly durable ceramic. Heater tubes are arranged within a chamber, the tubes carry ambient pressure high temperature combusted gases and the chamber containing high pressure lower temperature working gases about the exterior of each tube.

Heat exchange can additionally be improved by increasing the exterior surface area of each tube relative to the interior surface thereof.

4 Claims, 12 Drawing Figures

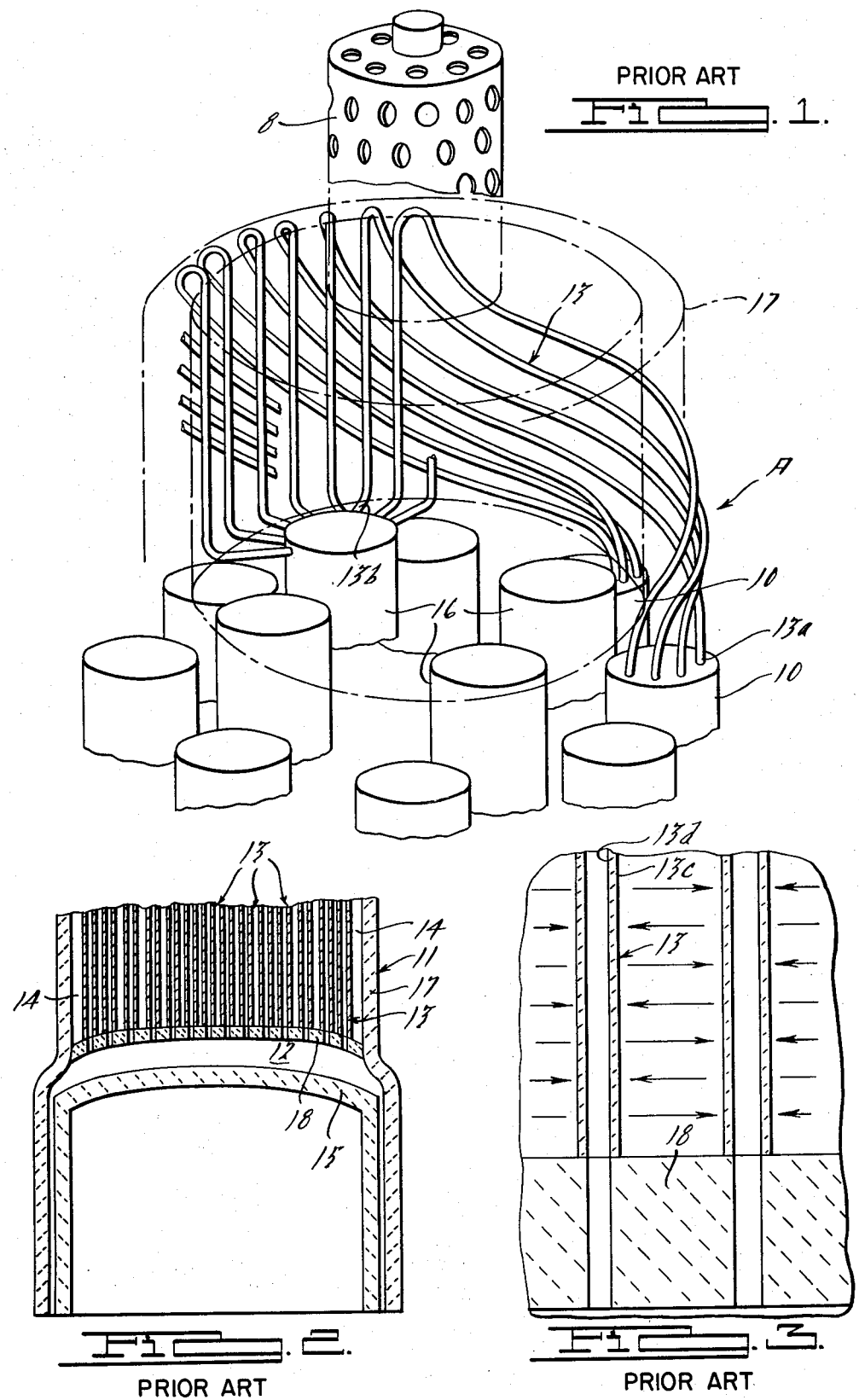

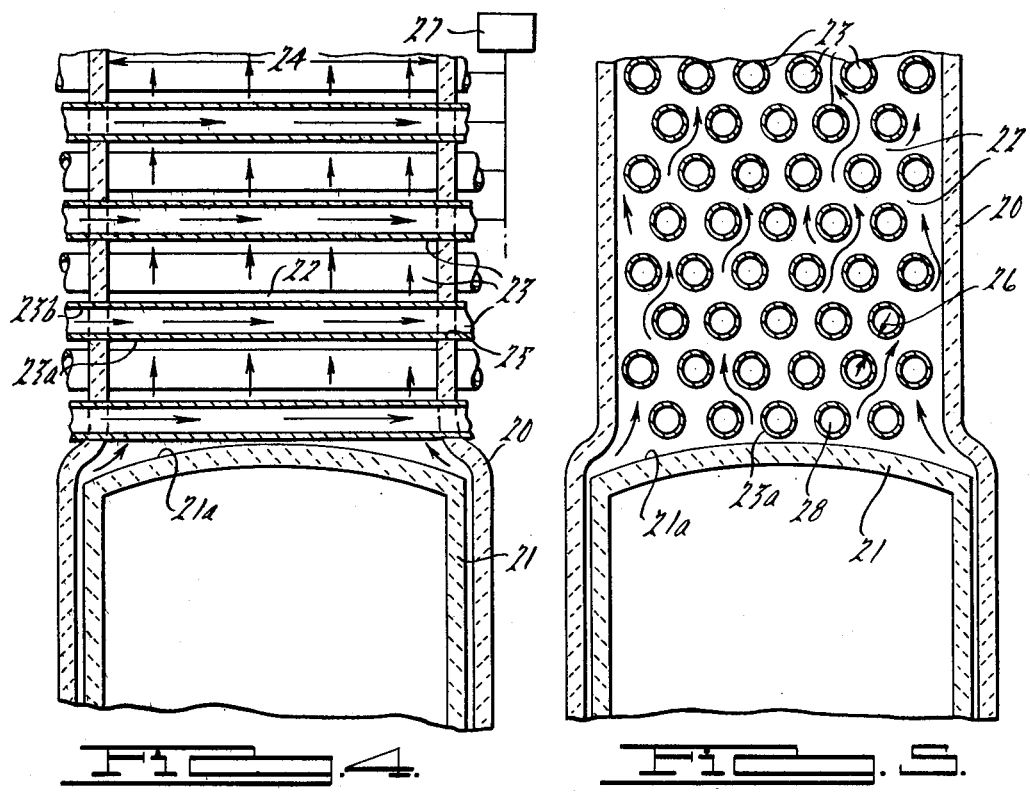
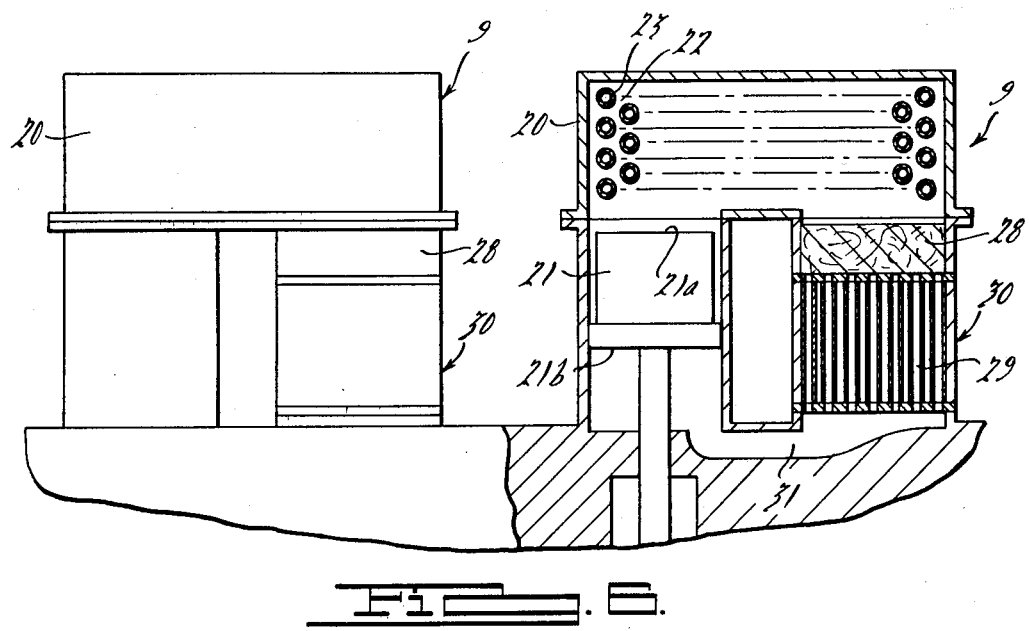

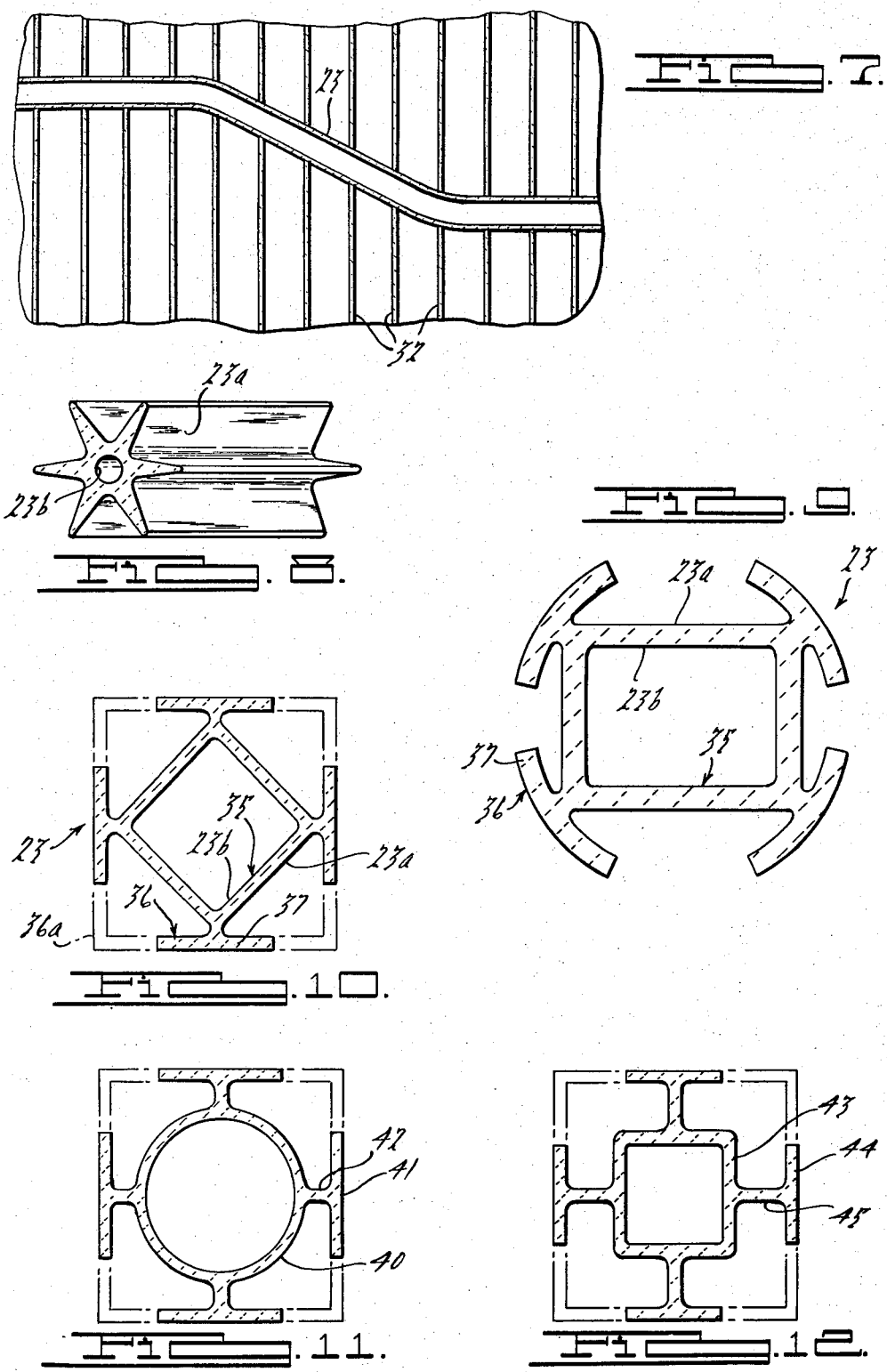

METHOD OF FABRICATING A HEAT EXCHANGER FOR STIRLING ENGINE

This is a division of Ser. No. 816,635 filed July 18, 1977, now U.S. Pat. No. 4,183,213.

BACKGROUND OF THE INVENTION

There are two important design features that have been consistently used in the heater head construction for Stirling engines for automotive use. First, the heater head employs a plurality of small heat transfer tubes (heater tubes), which communicate with an associated regenerator-cooling apparatus to complete a closed working fluid circuit. Typically these heater tubes have been constructed of high temperature metals, such as austenitic stainless steel, or nickel based or cobalt based heat resistant alloys. Secondly, the working fluid is selected as hydrogen and maintained under an operating pressure which is extremely high, i.e. in the range of 50-200 atmospheres. The necessity for the use of hydrogen under extreme pressure is to achieve rates of heat and mass-transfer which will make the thermal efficiency and specific output of the engine tolerable and within design goals.

However, the use of these two features wherein high pressure fluid is closed within a maze of small diameter tubing for heat absorption, has created several problems. One of the most important and frequent problems is that of distortion and cracking of the metallic tubes under severe thermal and mechanical stresses created during operation of the engine. The mechanical bursting stresses are obvious in that the high pressure within the internal volume of the small diameter tube is considerably greater than the pressure surrounding the outer wall of such tube which is typically at ambient pressure conditions. In addition, thermal stresses are generated by the extreme thermal gradient across the tube walls, the temperature of the gas surrounding the tubes being over 2000° F. and the temperature of the closed working gas being in the range of 1200°-1800° F.

To insure that the maze of heater tubes are not destroyed by such mechanical and thermal stresses, the art has turned to exotic materials. But even with the use of exotic heat resistant alloys, the stresses have increased the probability that such tubing will have a limited life potential.

SUMMARY OF THE INVENTION

A primary object of this invention is to provide a heater head construction for a Stirling type engine which promotes improved efficiency of heat transfer while reducing the cost of fabrication as well as the cost of materials used in such heater head construction.

Another object of this invention is to provide a heat exchange mechanism capable of transferring heat units from one body of gas maintained at a temperature of 2000°-3000° F. and at generally ambient pressure conditions, with another body of gas maintained at a relatively cooler temperature but at 50-200 atmospheres, such heat exchanger accommodating large thermal and mechanical stresses across the heat exchange walls thereby promoting durability and improved heat exchange efficiency.

Yet still another object of this invention is to provide an improved method of fabricating a heater head for a Stirling type engine.

Features pursuant to the above objects comprise the use of: (a) the reversal of the location of ambient pressure hot gases and high pressure working gases so that the ambient pressure hot gases are disposed within small tubes and the high pressure working gases surround said tubes within a unitary enclosure, (b) an all ceramic heater head is employed consisting of a cylindrical heat exchange chamber extending from a piston housing, closely spaced cylindrical tubes extending in parallel arrangement through said chamber, the interior of said tubes being separated from the interior volume of said chamber, whereby high pressure working fluid will occupy the separated interior volume of the chamber surrounding each of the tubes thereby placing the outer wall of each tube under compression, (c) dimensional spacing between each of the tubes is no greater than 0.25-50 the diameter of a tube and the dimensional spacing between the tubes most adjacent the piston and the piston in its uppermost position is no greater than 0.5-0.75 the diameter of a tube, and (d) sizing of the thickness of the tube walls to be in the thickness range of 10 mils.

SUMMARY OF THE DRAWINGS

FIG. 1 is a fragmentary schematic perspective of a prior art heater head assembly illustrating the general arrangement of heater tubes and the surrounding heater chamber enclosing the combustible gases;

FIG. 2 is a sectional view of a single hot chamber located above one piston, said structure being idealized for purposes of depicting a single chamber construction, said structure being in accordance with the prior art;

FIG. 3 is an enlarged fragmentary sectional view of a portion of the structure of FIG. 2;

FIG. 4 is a fragmentary sectional elevational view of a heater head construction in accordance with the present invention;

FIG. 5 is a sectional end view of the structure of FIG. 4;

FIG. 6 is a fragmentary elevational and idealized view of a Stirling engine with a series of interconnected heater heads employing the structure of FIGS. 4 and 5;

FIG. 7 is a fragmentary schematic view of an alternative heater tube configuration and additional support walls;

FIG. 8 is a perspective view of still another form of heater tube configuration; and FIGS. 9-12 are sectional views of still other alternative heater tube configurations.

DETAILED DESCRIPTION

The current prior art mode of construction of a heat exchanger system A in a Stirling engine having an external combustion system 8, useful for automotive operation, is shown in FIGS. 1-3. A plurality of power piston assemblies are arranged in cylinders 10 in a concentric arrangement. One end of each cylinder 10 is considered a hot chamber 11 in which high pressure hydrogen gas 12 absorbs heat through the walls of tubes 13 from a surrounding combusted gas 14. The maze or labyrinth of heater tubes 13 each have one end connected to a hot chamber 11 and another end 13b connected to an intermediate cylinder 16 containing a regenerator and cooling mechanism. The volume contained within the head of each of said cylinder 16 and chamber 11 and within said maze of tubes is less than the volume of hot gases 12 surrounding said tubes. The area of outer the surface 13c of each tube is slightly greater (but not much different), than the area of the inner surface 13d. The higher volume of the combusted gases does not significantly improve heat transfer from surface 13c to 13d to the smaller volume of working fluid. The working fluid is usually hydrogen or helium at 50–200 atmospheres pressure. The high pressure gas moves through such tubes and obtains operating temperatures in the range of 1200°–1800° F.

The materials presently used by the prior art for the construction of such tubes is usually selected from the group comprising austenitic stainless steels, nickel-based (heat resistant) alloys and cobalt-based (heat resistant) alloys. The shell of the chamber is typically constructed of the same material. As shown in FIG. 1, the tubes are arranged to extend firstly in an upright direction, gradually merging to a spiral configuration and then again turning downwardly, with a right angled turn to connect to cylinder 16. Such tubes are welded or brazed at their ends to the membrane 18 and sometimes to the shell 17 of the hot chamber, such welding operation being expensive and time consuming for fabrication.

With such an arrangement, it is frequent to experience cracking of the tubes under severe thermal and mechanical stresses as well as to experience distortion of the membranes 18 at the point of juncture with the tubes. Such stresses are due to two principle forces working together, one is the mechanical force of high pressure gas within the tubes tending to produce bursting stresses. The other is due to the thermal gradient in the direction taken from the highest temperature zone at the exterior surface 13c to the coolest temperature zone at the inner surface 13d which difference may be as great as 200°–1800° F. The temperature gradient tends to set up tensile stresses which are sympathetic with the bursting stresses of the tube. Selections of exotic materials as heretofore suggested which are highly expensive and in short raw material supply; has not successively overcome such mechanical and thermal stresses. Such metals or alloys have a coefficient of thermal expansion which is in the range of 8.5–9.26 inch/inch/°F. The maximum operating temperature for such alloys is usually in the range of 1800°–2000° F. and the thermal gradient through such material is typically in the range of 183–215 btu/inch/hour/sq.ft./°F. The material when used for tubes in a Stirling engine frequently incur thermal distortion due to repeated cycling between temperatures of 70° F. to 1800° F. The high temperature of the combusted gases and the temperature gradient operate on the tube walls to generate significant tensile stresses. These tensile stresses are aggravated by the force of high pressure fluid contained within the tubes producing bursting stresses. Frequently such thermal and bursting stresses will crack the tubing at stress points or weak points on the surface of the alloy. When this occurs, the entire heater tube assembly is inoperative. Presently, the joints between the tubes and the heat exchanger wall are fabricated by brazing which is expensive of material and time.

The obviation of these problems is obtained by reversing the locus of the heat transfer gases and to make the entire heater head assembly entirely of a low cost selected material which can be fused and converted to a strong ceramic by simple furnace sintering. The low cost material can be extruded to a variety of cylindrical cross-sections to favorably promote a difference in the area of the internal and external surfaces of the heater tubes.

Turning now to FIGS. 4–6, the preferred embodiment for heat exchange assembly of this invention is comprised of a heater head chamber wall 20 which surrounds the end of working piston 21 and defines an enclosed space or chamber 22 of a predetermined volume. Transversely extending tubes 23 are defined to extend across the entire lateral dimension 24 of the chamber and through the wall 20. The tubes 23 may be straight cylinders, each extending through openings 25 in the chamber walls and snuggly fitting the walls defining said openings 25. The spacing between the tubes may be controlled so that the distance 26 between any two tubes is no greater than 0.25–50 of a diameter of the tubes used. A collector means 27 is employed to direct combusted exhaust gases from an external combustion circuit to the ends of such laterally extending tubes 23 so that the hot gases (at ambient pressure) may pass through the interior 28 of such tubes at a predetermined rate. The space surrounding said tubes is open to the end face 21a of said piston 12; thus a closed high pressure working fluid (hydrogen gas) can be contained within the chamber wall 20 and and laterally extending tubes 23. Since the high pressure working fluid surrounds the tubes, the tube structure is kept under compression. The high pressure working fluid (at a pressure varying between 50–200 atmospheres and at a working temperature of 1200°–1800° F.) surrounds the tubes, each tube is thereby kept under compression. The high temperature of the combusted gases and the resulting temperature gradient across the wall of each generates tensile stresses in the tube walls. However, since the compressive stress and thermal tensile stress are opposite in nature, they compensate for each other. Therefore, the resultant stress will be fairly small compared to that experienced with the prior art systems.

The embodiment of FIGS. 4 and 5 is somewhat idealized; a plurality of heater heads 9 must be used, such as shown in FIG. 6. Here the closed working circuit is shown as defined by the piston face 21a at one extreme end and the other face 21b at the other extreme end. The chamber 22, space within regenerator 28, passages 29 defined in a cooling device 30, and passage 31 communicating with the under side of piston 21, complete said circuit.

Greater mechanical support, as well as some improvement in heat transfer can be obtained if additional webs or walls 32 (as shown in FIG. 7) are employed to support each tube 23 and if the tubes are given an offset configuration. The walls will be bonded to the chamber wall 20 and extend therebetween.

With an appropriate tube design such as shown in FIGS. 8–12, thermal stresses can be further reduced and improved heat transfer obtained, which will result in extended service life of the heater head components. As will be discussed later, it has been found that the tubes can be extruded from silicon and shaped in a variety of cross-sections. To obtain an increased external surface 23a while holding the internal surface 23b to a fixed value, the tube wall can be shaped as a star in cross-section, as shown in FIG. 8. Even greater surface area differentials may be obtained if the tubes 23 are extruded with an inner tube portion 35 and an outer tube portion 36; then certain parts 36a (shown in broken outline) are sheared away to leave fins 37 which act as an extension of the outer surface 23a. In FIG. 10, the tube portions are square cylinders, set at an angular relation to each other. In FIG. 11, the inner tube portion 40 is a round cylinder connected to a square cylindrical outer tube portion 41 by webs 42. In FIG. 12, the inner and outer tube portions (43–44) are aligned square cylinders of, connected by webs 45.

By constructing the tubes and the chamber walls of a ceramic material, great economy of fabrication can be achieved as well as increasing the temperature range for the exhaust gases transmitted through said system. For example, employing silicon carbide ceramic, the thermal coefficient of expansion is low at about 2.6 at a temperature level of about 1800° F., and thermal conductivity will vary from 720 btu/inch/hr./sq. ft/° F. at 1100° F. to about 174 btu/inch/hr./sq. ft./° F. at 2292" F. The thermal coefficient of expansion of exotic metals is 3 times larger than silicon carbide. The heat transfer characteristics permits the chamber 22 to be smaller in size than a chamber constructed of exotic metals.

A preferred method of making an all ceramic heater head construction of this invention, comprises:

(a) Mixing and forming a ceramic slurry having a polymeric binder. The filler material for the ceramic is silicon or magnesium-aluminum-silicate (a glassy cordierite frit). The binder for such ceramic slurry may be preferably selected as a tri-block polymer with polystyrene end blocks (e.g. polystyrene—polybutadiene—polystyrene with 30% styrene and 70% butadiene) and is combined with a paraffinic oil to form the binder. The oil should be carefully matched chemically so that it does not disrupt the physical cross links formed by the thermal plastic domains. Further, the oil must have a boiling point appropriately chosen for the particular thermal plastic elastomer so that it is not significantly removed during mixing at elevated temperatures. The boiding point must be low enough so that it is removed rapidly. A boiling point range of 200° F. to 400° F. has been found to be useful. The choice of the oil makes a leaching step unnecessary before burn out. A preferred mixture for such slurry is comprised of a thermal plastic elastomer (such as katron 1101) 14.5 grams, 12.5 grams of a volatile oil such as parafinie napthamatic oil with a boiling point of 200°–400° F. (such as Shell Flex), and 100 grams of a filler such as silicon. The materials are mixed at 200° F. to 320° F. in a rubber mill, a banbury mixer, or in other suitable mixers until a uniform mixture is obtained.

(b) The mixture is now extruded, calendered, molded or shaped. Preferably, the tubes are formed by extruding the slurry as a cylinder with a desired cross-section, such as a star, to increase the difference in surface area between the O.D. and I.D. The slurry is also rolled into sheets which may be separated and formed into an exchanger chamber or formed into tubes.

(c) After the extruding and forming process is completed, the molded parts are assembled preferably in a configuration as shown in FIGS. 4–5. The assembly is then heated in a carburizing atmosphere to convert the silicon to silicon carbide. Heating follows the sequence: 200°–220° F. for four hours, 350°–450° F. for four hours and finally 800° F. for four more hours. Heating may be carried out in air if a cordierite filler is employed.

(d) Finally the heated molded part is fired with the following heating cycle: (i) heating rapidly to 2200° F., (the rate being at 600° F. to 800° F. per hour), and (ii) heating slowly from 2200° F. to 2500° F. (the heating rate should be at 100° F. per hour) in the case of magnesium aluminum silicate. In the case of silicon carbide the sintering is carried out at temperatures 2700° F. to 3000° F. No separate brazing of each tube end to the chamber wall is necessary. The entire assembly is fused together simultaneously which is economical as to manpower and method.

The spacing between tubes should be about 0.25–0.5 the diameter of a selected tube size. This permits the volume occupied by the combusted gases within chamber 22 to be considerably smaller than required by the prior art.

I claim:

1. A method for fabricating a ceramic heater head for use in a Stirling engine, comprising:

(a) forming a ceramic slurry comprised of a binder and silicon filler powder, said binder consisting essentially of a mixture of a selected parafinic oil and a tri-block polymer with polystyrene end blocks, said oil being selected to prevent destruction of the cross links formed by the thermal plastic domains of said polymer and a boiling point range of 200°–400° F., (b) mixing said slurry at a temperature of 200°–300° F. to obtain a uniform mixture, (c) forming said slurry into tubes having an internal diameter which is 5–6 times the tube wall thickness and into a dominant cylindrical chamber effective to operate as a hot chamber for said Stirling engine, (d) heating said formed sheets in a carburizing atmosphere in steps: 200°–240° F. for four hours, 250°–275° F. for four hours, 350°–450° F. for four hours, 800° F. for four hours, (e) perforating openings in the wall of said cylindrical chamber having a size effected to mate with outside diameter of said tubes, (f) assembling said formed tubes to extend in parallel arrangement across the interior of said chamber having the ends of said tubes supported in said perforate openings of said walls, (g) heating said assembly rapidly in a carburizing atmosphere, to 2000°, at a rate of 600°–800° F. per hour, and then to 2200° F.–2500° F. at a rate of 100° F. per hour.

2. The method as in claim 1 in which said tubes are formed by extruding said slurry into cylinders, said cylinders having a cross-section with the outside surface area being greater than the inside surface area.

3. The method as in claim 2, in which the extruded tube cross-section is comprised of interconnected inner and outer tube portions, part of the outer tube portion being sheared to convert the outer tube portion into fins augmenting the outer surface area of each tube.

4. The method as in claim 1 in which said tubes are formed from extruded unribbed sheets and said dominant cylindrical chamber is formed from an extruded unribbed sheet.

* * * * *